United States Patent [19]

Muller et al.

[11] Patent Number: 5,335,411
[45] Date of Patent: * Aug. 9, 1994

[54] METHOD OF ATTACHING A FASTENING ELEMENT TO A PANEL

[75] Inventors: Rudolf R. M. Muller, Frankfurt; Jiri Babej, Lich, both of Fed. Rep. of Germany

[73] Assignee: Profil Verbindungstechnik GmbH & Co. KG, Stadtteil Koppern, Fed. Rep. of Germany

[*] Notice: The portion of the term of this patent subsequent to Oct. 12, 2010 has been disclaimed.

[21] Appl. No.: 101,920

[22] Filed: Aug. 4, 1993

Related U.S. Application Data

[63] Continuation of Ser. No. 786,204, Oct. 31, 1991, Pat. No. 5,251,370.

[51] Int. Cl.$^5$ .............................. B23P 11/00
[52] U.S. Cl. .......................... 29/512; 29/515; 29/520; 411/180; 403/282; 403/285
[58] Field of Search ............... 29/509, 512, 515, 520, 29/798, 432.2; 411/173, 176, 180; 403/282, 283, 285

[56] References Cited

U.S. PATENT DOCUMENTS

| | | | |
|---|---|---|---|
| 1,976,019 | 10/1934 | Helm . | |
| 2,456,118 | 12/1948 | Foster . | |
| 2,521,505 | 9/1950 | Doyle . | |
| 3,060,562 | 10/1962 | Fransson . | |
| 3,299,500 | 1/1967 | Double . | |
| 3,314,138 | 4/1967 | Double . | |
| 3,436,803 | 4/1969 | Sarnoff . | |
| 3,754,731 | 8/1973 | Mackal et al. | 251/145 |
| 3,800,401 | 4/1974 | Jesevich et al. | 29/432.2 |
| 3,871,264 | 3/1975 | Hallock | 85/30 |
| 3,926,236 | 12/1975 | Pouch et al. | 151/41.73 |
| 3,938,239 | 2/1976 | Lauth | 29/512 |
| 4,018,257 | 4/1977 | Jack | 151/41.72 |
| 4,039,099 | 8/1977 | Boxall | 220/91 |
| 4,092,773 | 6/1978 | Donahue | 29/512 |
| 4,193,333 | 3/1980 | Hallock | 85/31 |
| 4,459,073 | 7/1984 | Muller | 411/176 |
| 4,574,473 | 3/1986 | Sawdon | 29/798 |
| 4,610,072 | 9/1986 | Muller | 29/512 |
| 4,688,960 | 8/1987 | Bien | 403/285 |
| 4,893,976 | 1/1990 | Milliser et al. | 411/180 |

Primary Examiner—Mark Rosenbaum
Assistant Examiner—S. Thomas Hughes
Attorney, Agent, or Firm—Howard & Howard

[57] ABSTRACT

A method of permanently attaching a fastening element, such as a nut or bolt to panels having a range of panel thicknesses, such as the metal panels used by the automotive and appliance industries. The fastening element includes a tubular barrel portion and preferably an annular bearing face surrounding the barrel portion. The method includes punching a hole in the panel, then plasticly deforming and drawing the panel surrounding the hole into a dome or frusto-conically shaped portion. The panel hole is thus enlarged to receive the fastener element barrel portion from adjacent the apex of the frusto-conically shaped panel portion and the bearing face is then driven against the panel, deforming the panel to a generally planar shape. The panel surrounding the hole is thereby driven against the tubular barrel portion which, in the preferred embodiment, includes radially projecting ribs, providing securement against rotation even in very thin panels. Finally, the free end of the barrel portion is deformed radially outwardly and preferably squeezed to form a secure interlock between the fastening element and the panel.

12 Claims, 3 Drawing Sheets

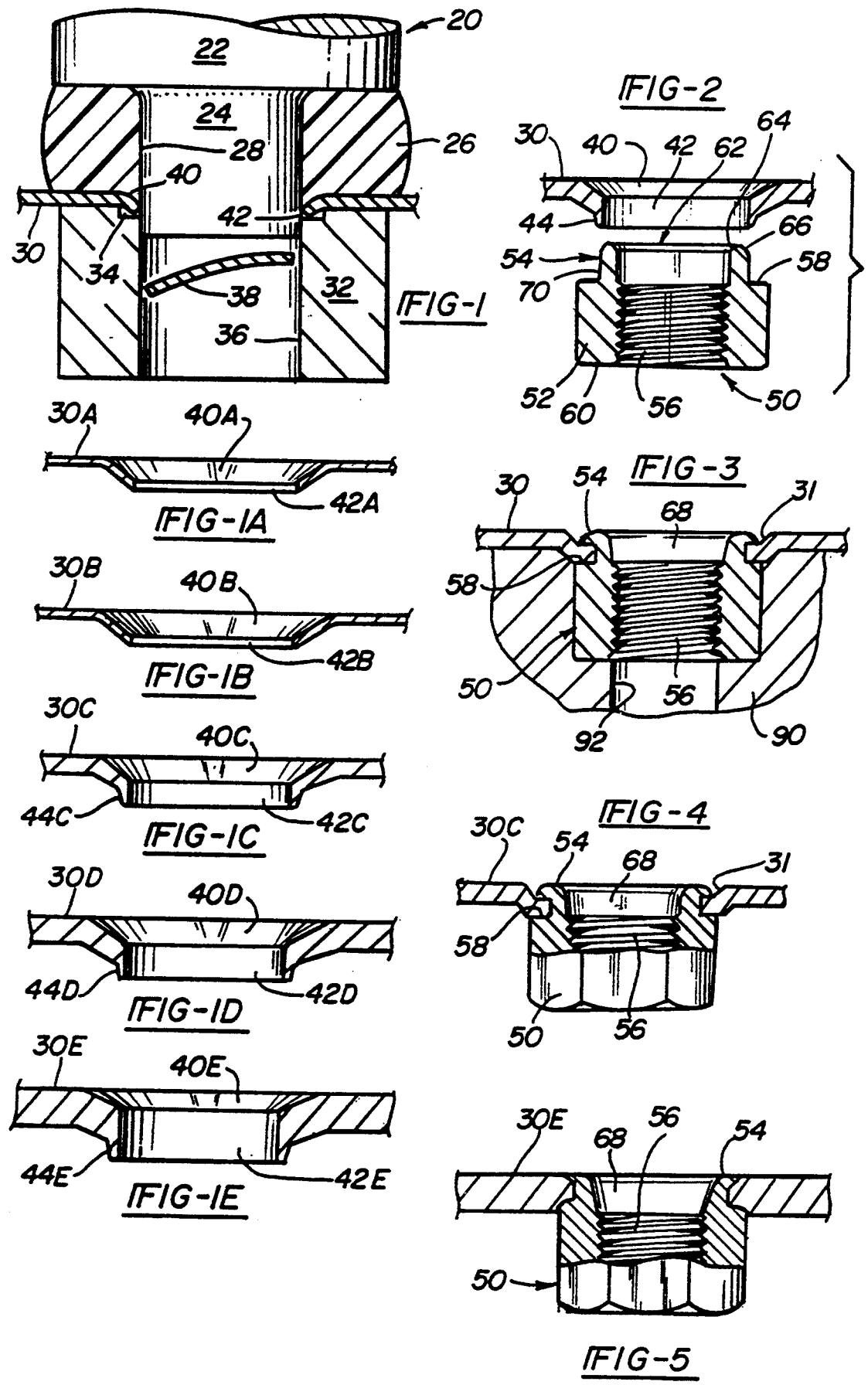

METHOD OF ATTACHING A FASTENING ELEMENT TO A PANEL

RELATED APPLICATIONS

This application is a continuation of co-pending application Ser. No. 786,204, filed Oct. 31, 1991, now U.S. Pat. No. 5,251,370.

BACKGROUND OF THE INVENTION

The present invention relates to methods of permanently attaching a fastening element, such as a nut or bolt, to a metal panel. The method of this invention is particularly useful for mass production applications, such as used by the automotive and appliance industries where a secure fastener installation is required in metal panels having a range of panel thicknesses. More specifically, the present invention relates to an improved riveting technique for flush mounting of a fastening element in panels having e range of panel thicknesses.

Pierce nuts, such as disclosed in U.S. Pat. No. 2,707,322, have been widely accepted in mass production applications such as the automotive industry. More recent improvements in pierce nuts, such as shown in U.S. Pat. No. 3,648,747, have resulted in improved retention of the pierce nut in the panel, although the original universal pierce nut remains a preferred installation in many applications. In both types of pierce nuts, several nuts may be installed in a metal plate or panel wherein the plate or panel may be simultaneously formed into a contoured shape, such as an automotive body panel or structural support.

More recently, fastening systems have been developed to permanently install both male and female fasteners in a panel in mass production applications, such as shown in U.S. Pat. Nos. 4,555,838 and 4,610,072. The fastening element in such fastening systems include a tubular or annular barrel portion which is riveted to the panel during the installation. The tubular barrel portion may be utilized to pierce a slug from the panel, which may be received in the tubular barrel portion, as disclosed in U.S. Pat. No. 4,555,838, or a punch may be utilized to pre-pierce the panel as disclosed, for example, in U.S. Pat. Nos. 4,711,021, 4,831,698 and 4,713,872. Although such fasteners have achieved commercial success, the use of such fasteners in mass production applications has been somewhat limited by the range of panel thicknesses utilized by the automotive industry, for example, and in certain applications requiring improved torque resistance in thin panels.

The need remains for a universal fastening system utilizing conventional installation tooling which may be used for a wide-range of panel thicknesses and preferably having improved torque resistance. The improved fastener and panel assembly must also have good push out and pull through strength and be adapted for mass production applications.

SUMMARY OF THE INVENTION

The improved method of attaching a fastening element to a panel of this invention is particularly, but not exclusively adapted for permanent installation of fastening elements in plasticly deformable metal panels having a range of panel thicknesses utilized in mass production applications, such as the automotive industry. The fastening element may be a female fastening element, such as a nut, or a male fastening element, such as a stud, bolt or the like. The fastening element includes a generally tubular barrel portion and preferably includes a body portion having a bearing surface surrounding the tubular barrel portion.

The method of this invention includes forming a hole through the panel which is to receive the fastening element. The method further includes drawing and plasticly deforming the panel into a generally dome-shaped or frusto-conical shaped portion surrounding the hole. The inside diameter o the hole is thus large enough to loosely receive the tubular barrel portion of the fastening element. The method then includes inserting the tubular barrel portion of the fastening element through the panel hole, preferably from adjacent the apex of the frusto-conical or dome-shaped portion and the method then includes plasticly deforming the panel to a generally planar shape, thereby reducing the diameter of the hole to a diameter which is less than the external diameter of the tubular barrel portion. The panel surrounding the hole is thus driven into the tubular barrel portion, increasing the torque required to rotate the fastening element in the hole. Finally, the method includes plasticly deforming the free end of the barrel portion radially outwardly, forming a mechanical interlock between the panel and the fastening element.

In the most preferred method of this invention, the panel hole is formed by punching the panel with a cylindrical punch while the panel is supported on a die member. The panel is thus simultaneously drawn and deformed into the die member and punched, forming the dome or frusto-conical shaped portion of the panel surrounding the hole. Further, in the preferred method of this invention, the dome-shape portion of the panel is deformed by driving the annular bearing surface of the body portion of the fastening element against the panel surrounding the hole, deforming the panel into a generally planar shape, as described. The panel may be supported on a second die member or die button having an annular riveting surface, such that the panel is flattened and the free end of the barrel portion is simultaneously deformed radially outwardly, forming the preferred mechanical interlock. In the most preferred method of this invention, the second die member further deforms the radially deformed barrel portion toward the bearing surface of the body portion of the fastening element, forming a substantially flush installation of the fastening element in the panel.

The torque resistance of the fastening element in the panel may be further improved by providing radially projecting ribs on the barrel portion and the method of this invention is uniquely adapted to provide improved torque resistance with such ribs. As described, the internal diameter of the hole is most preferably less than the external diameter of the tubular barrel portion when the panel is relatively flat. Thus, the panel portion surrounding the hole is driven into the barrel portion as the panel is deformed from a generally dome-shape to a generally planar shape. Where the tubular barrel portion includes radially projecting ribs, the panel is driven into the ribs, as the panel is flattened, and the tubular barrel portion resiliently drives the ribs into the panel. The resultant hoop stress or radially directed strain energy results in substantially improved torque resistance, which is an important advantage of the fastening element and panel assembly of this invention. The torque resistance may also be improved by using a split tubular riveting portion, although a continuous tube is preferred.

Further, the same fastening element may be attached to metal panels having a relatively wide-range of different panel thicknesses using the same or similar installation tooling. Further, the fastening element barrel portion may be installed flush in the panel without a substantial embossure or bead. Thus, the method of installation of this invention provides the several advantages which are the objects of this invention. Other advantages and meritorious features of the method of this invention will be more fully understood from the following description of the preferred embodiments, the appended claims and the drawings, a brief description of which follows.

BRIEF DESCRIPTION OF THE DRAWINGS

FIG. 1 is a side partially cross-sectioned view of an apparatus suitable for forming a hole in a panel and simultaneously forming a frusto-conical in the panel;

FIGS. 1A–1E are of varying thickness formed by the punching apparatus shown in FIG. 1;

FIG. 2 illustrates a female fastening element being received in a panel in the method of this invention;

FIG. 3. illustrates the fastening element and panel of FIG. 3 during the installation of the fastener in the panel;

FIG. 4 illustrates the female fastening element and panel assembly attached as shown in FIGS. 2 and 3;

FIG. 5 is a side partially cross-sectioned view of a female fastening element and panel assembly similar to FIG. 4, except with a thicker panel;

DESCRIPTION OF THE PREFERRED METHODS OF INSTALLATION OF THIS INVENTION

Figure 6:
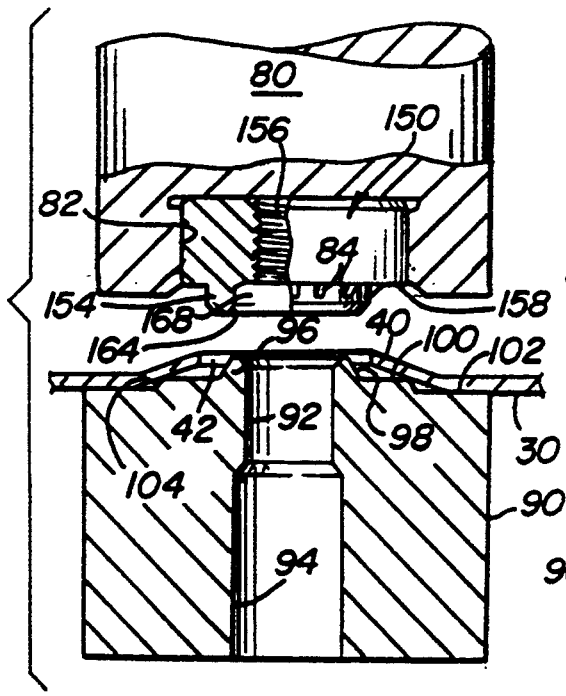
FIGS. 6 and 7 illustrate the installation of a further embodiment of a female fastening element being installed in a relatively thin panel using one embodiment of an installation apparatus.

FIG. 1 illustrates one embodiment of a punch apparatus suitable for punching and forming a panel in accordance with the method of this invention. The punch apparatus includes a punch 20 having a body portion 22 and a punch portion 24. In the disclosed embodiment, the punch portion 24 is cylindrical and has a diameter smaller than the diameter of the body portion 22 to receive a plastic spring member 26. The spring member 16 includes a cylindrical bore 28 which closely receives the cylindrical punch portion 24 of the punch. Plastic springs of the type shown in FIG. 1 are commercially used for stripping the panel 30 from the punch and are sometimes referred to as a stripper. In the disclosed embodiment, however, the plastic spring functions not only as a stripper, but also deforms the metal panel in the die member 32, as described below. Such plastic springs are generally formed from a high density polyurethane.

The die member 32 includes an annular die cavity 34 and a cylindrical bore 36 which receives the panel slug 38. The method steps performed by the apparatus shown in FIG. 1 thus includes two steps. The cylindrical punch portion 24 punches a circular slug 38 from the panel 30, forming a circular opening or hole 42 in the panel. The panel is substantially simultaneously drawn and deformed into the annular die cavity 34 by the punch portion 24 and the plastic spring 26, forming a frusto-conical panel portion 40 adjacent the hole 42, as best shown in FIGS. 1A–1E discussed below. Depending upon the panel hardness and thickness, the panel may be drawn into the die cavity 34 and then punched or the steps may be separately performed. The panel slug 38 is removed through the cylindrical bore 36 of the die member.

FIGS. 1A–1E illustrate cross-sections of panels of varying thickness punched and formed with the apparatus illustrated in FIG. 1. As described above, the method of attaching a fastening element to a panel of this invention is suitable for attaching a fastening element to panels of different or varying thickness, such as utilized by the automotive industry. The panel shown in FIG. 1A, for example, has a thickness of 0.75–0.80 millimeters (mm). The panel illustrated in FIG. 1E has a thickness of about 4 mm, which illustrates the range of panel thicknesses typically utilized by the automotive industry. Such panels are generally formed of steel, such as AISI 1008 or 1010 steel, which may be hot or cold rolled and are generally of commercial draw quality. Similar panels are used by many other industries. The appliance industry uses corrosion resistant and antimagnetic steels which are particularly suitable for tile method of this invention because of their relatively poor weldability. Panels are used by tile automotive industry for body panels, brackets and structural supports. The method of this invention may also be used to permanently install fastening elements in aluminum, copper and brass panels and other panels which require an installation of the type described herein. It is important to note, however, that the punch and forming apparatus shown in FIG. 1 may be utilized to punch and form panels having a wide-range of panel thicknesses, such as illustrated in FIGS. 1A–1E.

As illustrated in FIGS. 1A and 1B, the thinner panels are punched and formed without extruding panel metal. In the thicker panels having a thickness greater than about 2.5 mm, a lip 44 is extruded axially by the punch portion 24, see 44C in FIG. 1C, 44D in FIG. 1D and 44E in FIG. 1E. This extruded lip aids in the retention of the fastening element on the panel, as described below. As will be understood by those skilled in the art, the panel may also be punched and formed in separate operations or the frusto-conical portion 40 may be formed in a configured die. A configured die would, however, require a separate die for a much smaller range of panel thicknesses, which would be a disadvantage in mass production applications where panels of different thickness are routinely used. The panel portion 40 may be characterized as frusto-conical shape or dome shape, wherein such terms are meant to include arcuate forms.

FIGS. 2–5 illustrate a female fastening element which may be installed in a panel 30 by the method of this invention. As used herein, the term fastening element refers to a male or female fastening element preferably including a fastening portion, such as a threaded portion, which may be utilized to attach the panel to a second structural element, such as a panel, bracket or the like. Such fastening elements would therefore include a nut or bolt, as illustrated, and other fastening elements, including the male or female components of a ball joint and the like.

The female fastening element or nut 50 illustrated in FIG. 2 includes a body portion 52 and an annular or tubular barrel portion 54, preferably integral with the body portion and coaxially aligned with the threaded bore 56. The body portion 52 preferably includes an annular bearing face or surface 58, which preferably surrounds the tubular barrel portion 54 and a driven face 60. The free end 62 of the barrel portion 54 in the disclosed embodiment includes an annular internal chamber 64 and an arcuate outer surface 66. The internal surface 68 of the barrel portion is preferably smooth and the external surface 70 in the disclosed embodiment is cylindrical. As described below, however, the external surface 70 may be polygonal to provide improved torque resistance, including octagonal or hexagonal.

In the method of this invention, the barrel portion 54 is preferably received through the panel hole 42 from adjacent the apex of the frusto-conical portion 40. That is, the fastening element is preferably received from the side of the panel opposite the side through which the punch 24 is received, as shown in FIG. 1. Further, the diameter of the exterior surface 70 of the pilot portion is less than the internal diameter 42 of the domed panel. In the most preferred method, the barrel portion 54 is loosely received in the domed panel hole 42, reducing alignment problems. FIGS. 3–5 illustrate fastening element and panel assemblies which may be formed by the method of this invention.

Figure 7:
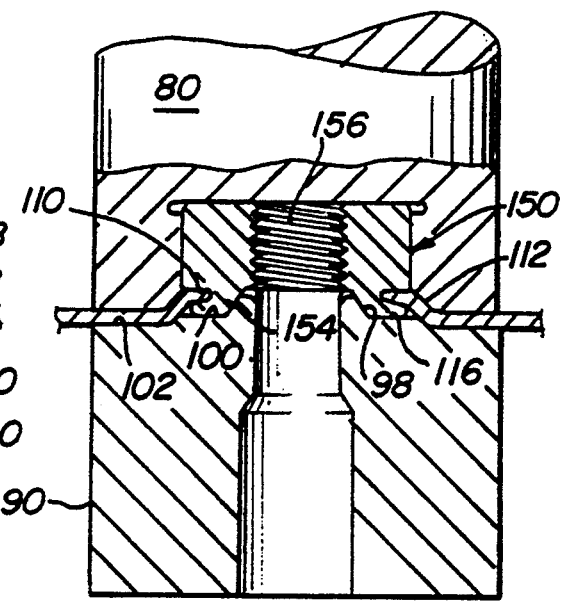
Figure 10:
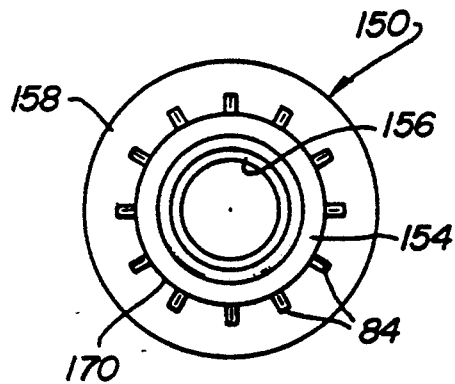
FIG. 10 is an end view of the embodiment of the female fastening element shown in FIGS. 6 and 7.
Figure 11:
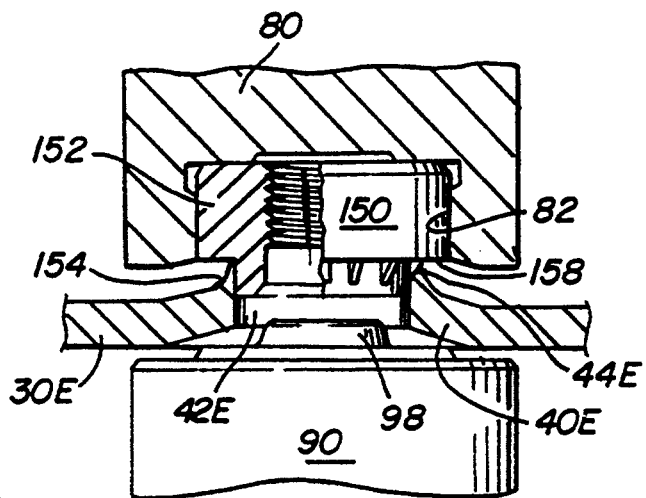
FIGS. 11 and 13 are partially cross-sectioned views of a female fastening element, panel and installation apparatus illustrating the installation of the female fastening element shown in FIG. 10.

FIGS. 6 and 7 illustrate an embodiment of an installation apparatus suitable for installing fastening elements of the type described. The installation apparatus includes a plunger 80 having a configured cavity 82, which receives and supports the nut 150, and a die member 90 which supports the panel 30 during installation of the fastening element and which deforms the pilot portion 154 radially outwardly to form a mechanical interlock with the panel 30, as now described. Reference may also be made to U.S. Pat. Nos. 4,543,701, 4,555,838 and 4,610,072 which disclose self-piercing and riveting fastening elements having a tubular barrel portion. The fastening element 150 illustrated in FIGS. 6, 7 and 10–14 may be identical to the fastener 50 illustrated in FIGS. 2–5, except that the female fastening element 150 includes radially projecting anti-rotation ribs 84 as best illustrated in FIGS. 6, 10 and 11. The anti-rotation ribs 84 are generally triangular and integrally joined to the bearing surface 158 of the body portion 152 and the external surface 170 of the barrel portion 154. The numbering of the elements of the female fastening element 150 is therefore the same sequence as the fastening element 50.

The die member 90 is generally referred to as a die button. In a disclosed embodiment, the die button 90 includes axial bores 92 and 94 which relieve pressure during the installation of the fastening element 150. The die face includes a central projecting die post 96 having a frusto-conical side face 98, a first flat annular surface 100 and a second flat annular surface 102, joined to the first annular surface 100 by a second conical surface 104. As described above, the pilot portion 154 is loosely received in the hole 42 through the panel and the annular bearing face 158 is then driven against the panel adjacent the hole 42, deforming the frusto-conical panel portion 40 to a generally planar configuration as shown in FIG. 7. The panel is deformed into a radially projecting portion 110 and a conical portion 112.

In the apparatus illustrated in FIGS. 6 and 7, the tubular barrel portion 154 is simultaneously deformed radially outwardly, as now described. The inside chamber 164 at the free end of the barrel portion is first received against the conical surface 98 of the die button post followed by the inside surface 168 of the barrel portion. These surfaces are then received against the annular flat surface 100, forming a radially outwardly projecting lip 116, as shown in FIG. 7. The annular surface 100 simultaneously deforms the radially projecting barrel portion 116 toward the bearing surface 158 of the body portion, squeezing the assembly and forming an intimate laminate comprising the radially projecting barrel portion 116, the radially projecting panel portion 110 and the bearing surface 158. A secure mechanical interlock is thus formed between the fastening element 150 and the panel 30.

Further, as described above, the internal diameter of the hole 42 in the panel 30 in the flattened condition shown in FIG. 7 is less than the external diameter of the barrel portion 154. The radially projecting panel portion 110 is thus driven radially inwardly against the external surface of the barrel portion into the radially projecting ribs 84, driving the ribs into the panel. Further, the tubular barrel portion resiliently resists radial deformation, driving the ribs into the radially projecting panel portion 110. The stress thus created is commonly referred to as hoop stress after the stress created by a barrel hoop or stay. That is, strain energy is directed radially inwardly against the barrel, which is resisted by the resilient tubular barrel portion. It will be understood, however, that all applications do not require anti-rotation ribs and even a smooth barrel will provide some resistance to rotation because of the method of this invention. Further, time barrel portion 154 may be polygonal and inserted into a circular hole. A circular hole is, however, preferred to avoid stress risers.

Figure 8:
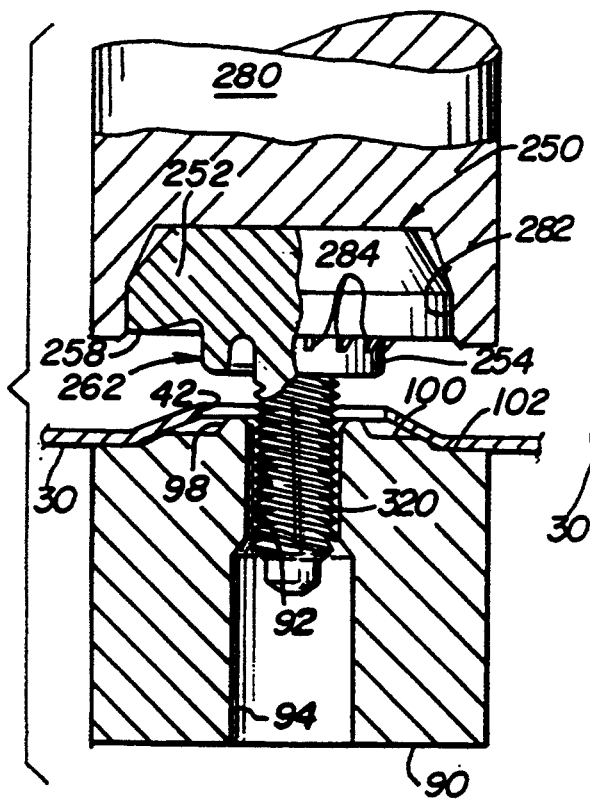
FIGS. 8 and 9 illustrate the installation of one embodiment of a male fastening element in a panel using an installation apparatus similar to the installation apparatus shown in FIGS. 6 and 7.
Figure 9:
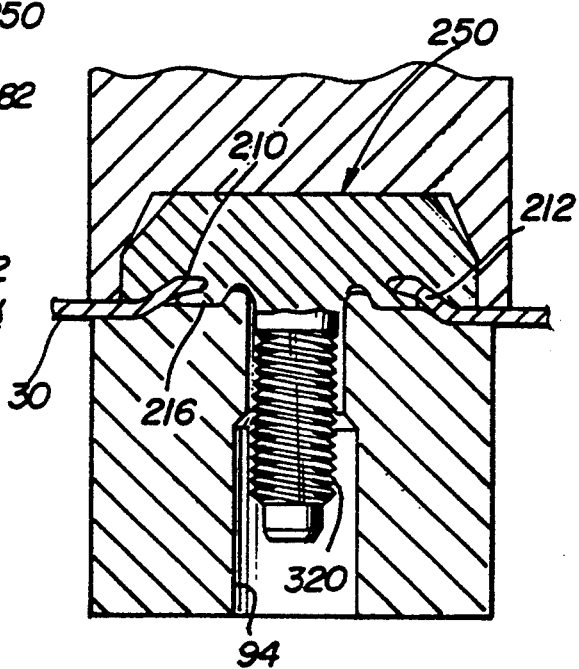

FIGS. 8 and 9 illustrate a method of installing a male fastening element 250. As shown, the male fastening element is installed in a relatively thin panel of approximately the same thickness as the panel 30 shown in FIGS. 6 and 7. The male fastening element 250 includes a tubular or annular barrel portion 254 having a free end 262 configuration as described above in regard to the fastening element 50 in FIG. 2. The body portion 252 of the male fastening element has been modified somewhat to provide a enlarged bearing surface 258 which will provide direct clamp loading of the fastener assembly, as will be understood by those skilled in the art. Of course, the male fastening element also includes a threaded shank or bolt portion 320 which is formed integrally with the fastener and co-axially aligned with the barrel portion 254. The plunger cavity 282 has been modified to conform to and receive the body portion 252 of the male fastening element; however, the installation of the male fastener element is substantially identical to the method described above in regard to FIGS. 6 and 7 and the die button 90 may be identical to the die button shown in FIGS. 6 and 7. As shown in FIG. 8, time barrel portion 254 is first received through the hole 42 in the panel 30 and the bearing surface 258 is driven against the panel, deforming the panel into the generally planar configuration shown in FIG. 9, including a radially projecting portion 210 and a generally conical portion 212. The barrel portion 254 is deformed radially outwardly by the conical face 98 and the flat 100, forming a radially projecting portion 216, as shown in FIG. 9. The radially projecting panel portion 210 is driven into the radially projecting ribs 284, forming secure anti-rotation means. Thus, the method of installing the male fastener 250 is substantially identical to the method of installing the female fastener 150 as described above in regard to FIGS. 6 and 7.

FIGS. 6–9 illustrate a fastening element installed "downwardly," wherein the fastening element 150 or 250 is received and retained in a plunger 80 or 280 and the plunger is driven downwardly to engage the fastening element with a die button 90. In mass production applications, where the fastening element may be installed in a progressive die, the fastening element may be installed upwardly as would be illustrated by turning FIGS. 6–9 upside down. Alternatively, the panel can be turned over after the panel is punched and formed as shown in FIG. 1. In the preferred method of this invention, the panel should be softer than the nut. Most preferably, the hardness of the panel should be less than about 60% of the hardness of the nut. The fastening element should have hardness and strength characteristics typical of those fasteners which meet the requirements of ISO Classes 8 through 12. The fastener may be formed from AISI 1035 steel and heat treated to the appropriate hardness. Thus, the method of this invention may be utilized to install fastening elements in most panels used in mass production applications. Further, it is important to note that the same fastener may be installed in panels having a wide range of thicknesses using the same or very similar installation tooling.

Figure 12:
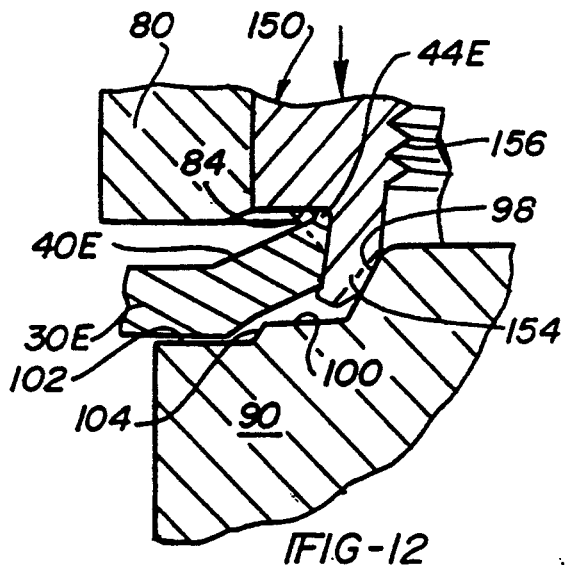
FIG. 12 is an enlarged partial cross-sectioned view of an intermediate step in the installation of the female element as shown in FIGS. 11 and 13.
Figure 13:
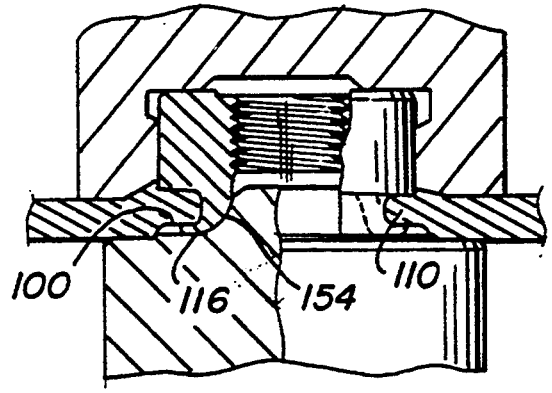

FIGS. 10–14 illustrate important details of the method of attaching fastening elements to a panel, particularly a thicker panel, as shown in FIG. 1E, above. The fastening element 150 has been described above in regard to FIG. 6. The fastening element includes a tubular barrel portion 154 and a plurality of radially projecting ribs 84. As shown in FIG. 11, the fastening element 150 is installed in a relatively thick panel 30E using the same tooling as used in the thin panel shown in FIG. 6. That is, the fastening element is received and supported within a cavity 82 in a plunger or punch 80 and driven through the panel opening 42E against the conical side surface 98 of the die post. The bearing surface 158 of the body portion 152 first engages the extruded portion 44E and the ribs 84 begin to bite into the panel as shown in FIG. 12. Finally, the annular die surface 100 is driven into the now radially projecting panel portion 110 and the free end 116 of the barrel portion is deformed radially outwardly as shown in FIG. 13, forming a secure installation. The extruded metal 44E helps to fill the C-shaped radially outwardly opening annular cavity formed by the barrel portion 154 and bearing surface 158 as shown in FIG. 13.

Figure 14:
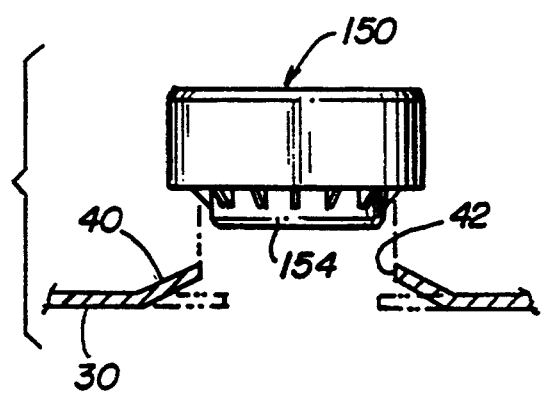
FIG. 14 is a partial cross-sectioned view, similar to FIGS. 6 and 7, illustrating the deformation of the panel during the installation of a fastening element.

FIG. 14 illustrates the deformation of the panel 30 during the installation of the fastener 150. As shown in FIG. 14, the hole 42 through the frusto-conical portion 40 has an inside diameter greater than the external diameter of the barrel portion 154, such that the barrel portion 154 is loosely received in the panel hole 42 during the installation of the fastening element. The panel is then deformed to a generally planar configuration, as shown, wherein the hole 42 has a diameter which is slightly less than the external diameter of the barrel portion 154. As described above, the panel is thus driven radially inwardly against the barrel portion during the final installation of the fastening element, improving the resistance to rotation of the fastening element in the panel.

It should now be evident to a person skilled in the art, comparing the fastening element and panel installations shown in FIGS. 4, 5, 7 and 9, that the method of attaching a fastening element of this invention may be utilized to install fastening elements to panels having a wide range of panel thicknesses using the same fastening element and tooling. As shown in FIGS. 3 and 4, the fastening element 50 is installed in a panel having an intermediate thickness such as shown, for example, in FIG. 1B. The radially deformed barrel portion 54 is flush with the panel 30. The panel does include a slight emboss 31, but the emboss is substantially less than the emboss formed in most applications. FIG. 5 illustrates and installation of the female fastener 50 in a relatively thick panel, such as a panel having a thickness 4 mm. The panel 30E has no emboss and the barrel portion 54 is flush with the panel. Finally, FIGS. 7 and 9 illustrate the installation of both male and female fastening elements in a relatively thin panel, such as the panel shown in FIG. 1B. The panel 30 does include a more substantially emboss, but the emboss in less than that formed by other methods and the radially deformed barrel portion 216 is flush or actually recessed in the panel 30.

Thus, the method of installing a fastening element of this invention may be utilized to install both male and female fastening elements in panels having a relatively wide range of panel thicknesses. In the illustrated embodiments, the fastening elements are installed in panels ranging in thickness from 0.75 mm to 4 mm. In testing of the fastening element and panel assembly, the push out strength was found to be more consistent with a wider range of panel thicknesses than prior methods discussed above. More Importantly, the fastening element and panel assembly shows improved torque resistance with thinner panels. For example, a 25% increase in torque resistance was found in a 0.8 mm panel compared to the fastener and panel assembly shown in U.S. Pat. No. 4,831,698. Thus, the method of permanently attaching a fastening element to a plasticly deformable panel of this invention achieves the goals of the invention discussed above.

As will be understood, various modifications may be made to the disclosed male and female fastening elements, installation tooling and method disclosed and described in regard to FIGS. 1–14, without departing from the purview of the invention. For example, the fastening element may have a polygonal barrel portion to further improve the torque resistance of the fastening element in the panel. The frusto-conical or dome-shaped portion 40 may be modified by using a configured die. However, in the preferred method of this invention, the panel hole is enlarged during the doming step, such that the barrel portion is loosely received in the panel hole during the final installation step. Thus, the method of this invention will be particularly useful for such applications as safety bolt anchors for automotive seat belt installations, particularly in thinner panel metals. Further, the fastening element may be installed in very thin panels metals now being used by both the automotive and appliance industries. Thus, it is anticipated that the method of this invention will find a broad range of applications.

We claim:

1. A method of attaching a fastening element to a plastically deformable panel, said fastening element including a generally tubular barrel portion and a generally radial bearing surface extending from adjacent said barrel portion, said method comprising the following steps:

(a) supporting a first face of said panel on a die support surface of a die member, said die member having an annular die recess, and said die support surface surrounding said die recess;

(b) driving a punch against a second face of said panel opposite said die member, said punch first drawing and deforming said panel into said die recess forming a generally conical depression in said panel, then said punch piercing an opening in said panel having a width greater than said fastening element barrel portion but less than said bearing surface;

(c) then inserting said barrel portion of said fastening element into said panel opening from said first face of said panel;

(d) driving said bearing surface of said fastening element against said first panel face, flattening said generally conical depression and reducing said panel opening width into contact with said fastening element barrel portion; and (e) receiving said panel in a generally radial recess in said barrel portion forming a mechanical interlock between said barrel portion and said panel.

2. The method of attaching a fastening element to a panel as defined in claim 1, where said method further includes supporting said second panel face on a second die member following drawing, deforming and piercing said panel, said second die member having a die opening coaxially aligned with said panel opening, said method including inserting said fastening element barrel portion from said first face of said panel through said panel opening into said second die member opening, then driving said fastening element bearing surface against said panel first face to deform said panel conical depression to substantially planar with the remainder of said panel and deforming said tubular barrel portion radially outwardly into said die member, forming said mechanical interlock between said barrel portion and said panel.

3. The method of attaching a fastening element to a panel as defined in claim 2, wherein said second die member includes a central die post having a projecting end portion and a generally conical side surface receiving an inside surface of said tubular barrel portion, said conical surface deforming a free end of said barrel portion radially outwardly entrapping a radially projecting portion of said panel adjacent said panel opening between said radially deformed end of said barrel portion and said bearing surface of said fastening element.

4. The method of attaching a fastening element to a panel as defined in claim 3, wherein said method further includes pressing said barrel portion free end toward said bearing surface, thereby squeezing said radially projecting panel portion and forming an intimate laminate and substantially flush installation of said fastening element in said panel.

5. A method of attaching a fastening element to a plastically deformable panel, said fastening element including an annular barrel portion and a radial bearing surface adjacent to and generally surrounding said barrel portion, said method comprising the following steps:

(a) supporting a first face of said panel on a panel supporting surface of a die member, said die member having a bore, an annular die recess surrounding an opening to said bore and said panel supporting surface surrounding said die recess;

(b) driving an end of a generally cylindrical punch against a second face of said panel opposite said die member, said punch having a diameter telescopically receivable in said die member bore and coaxially aligned with said bore, said punch first drawing and deforming said panel into said die member annular recess and forming a generally cone-shaped depression in said panel, and said punch piercing a generally circular hole in said panel as said punch is received in said die member bore, said hole having a diameter greater than said fastening element barrel portion, but less than said bearing surface;

(c) inserting said fastening element annular barrel portion into said panel hole from said first face of said panel;

(d) then driving said fastening element radial bearing surface against said panel, said bearing surface deforming said cone-shaped depression generally planar and reducing said hole diameter and said panel into engagement with said fastening element barrel portion; and (e) disposing said panel in a generally radial recess in said barrel portion to form a mechanical interlock between said fastening element barrel portion and said panel.

6. The method of attaching a fastening element to a panel as defined in claim 5, wherein said panel second face is supported on a second die member following deforming, drawing and piercing said panel, said second die member having a die opening coaxially aligned with said panel hole, said method further including inserting said fastening barrel portion through said panel hole into said second die member opening from said first panel face, then driving said bearing surface against said panel first face to deform said panel substantially planar, and deforming said barrel portion raidally outwardly in said second die member to form said mechanical interlock between said barrel portion and said panel.

7. The method of attaching a fastening element to a panel as defined in claim 6, wherein said second die member includes a central die post having a projecting end portion and a generally conical side surface receiving an inside surface of said tubular barrel portion, said method further including deforming a free end of said barrel portion radially outwardly on said second die member conical surface and entrapping a radially projecting portion of said panel adjacent said hole between said radially deformed free end of said barrel portion 5and said bearing surface of said body portion.

8. The method of attaching a fastening dement to a panel as defined in claim 7, wherein said method further includes pressing said barrel portion free end toward said bearing surface, thereby squeezing said radially projecting panel portion, forming an intimate laminate of said barrel portion free end, said radial panel portion and said bearing surface, and forming a substantially flush installation of said fastening element in said panel.

9. A method of attaching a fastening element to a plastically deformable metal panel, said fastening element including a generally tubular barrel portion, a generally radial bearing surface extending from adjacent said barrel portion, and a plurality of generally radial ribs projecting from said bearing surface, said method comprising the following steps:

(a) deforming said panel into a generally conical depression and forming an opening through said panel conical depression generally centered in said conical depression having a diameter greater than an outside diameter of said tubular barrel portion, but less than said bearing surface;

(b) inserting said barrel portion of said fastening element from the apex of said conical depression, through said panel opening; and (c) deforming and flattening said generally conical panel depression, thereby reducing said panel opening diameter and forcing said panel into bearing contact with said barrel portion in a generally radial recess in said fastening element and driving said radial ribs into said panel to deform said panel and forming a secure mechanical interlock between said barrel portion and said panel.

10. The method of attaching a fastener element to a panel as defined in claim 9, wherein said method further includes deforming a free end of said barrel portion radially outwardly, thereby forming said radial recess between said barrel portion free end and said bearing surface.

11. The method of attaching a fastening element to a panel as defined in claim 10, wherein said barrel portion free end is deformed radially outwardly as said generally conical panel depression is flattened in a continuous operation.

12. The method of attaching a fastening element to a panel as defined in claim 11, wherein said method includes pressing said barrel portion radial free end toward said bearing surface, thereby squeezing said panel portion and forming an intimate laminant of said barrel portion free end, said panel and said bearing surface, and forming a substantially flush installation of said fastening element in said panel.

* * * * *